United States Patent [19]
Albrow et al.

[11] Patent Number: 6,061,340
[45] Date of Patent: May 9, 2000

[54] TRANSMISSION OF DIGITAL DATA MESSAGES IN DIGITAL TELEPHONY

[75] Inventors: Richard John Albrow, Hadstock; Simon Alexander Black, Whittlesford; Leigh Carter, Haslingfield; Rupert Leslie Alexander Goodings, Cambridge; Paul Maxwell Martin, Newmarket; Neil Philip Piercy, Newton, all of United Kingdom

[73] Assignee: Ionica International Limited, Cambridge, United Kingdom

[21] Appl. No.: 08/793,326

[22] PCT Filed: Sep. 8, 1995

[86] PCT No.: PCT/GB95/02134

§ 371 Date: May 28, 1997

§ 102(e) Date: May 28, 1997

[87] PCT Pub. No.: WO96/08934

PCT Pub. Date: Mar. 21, 1996

[30] Foreign Application Priority Data

Sep. 16, 1994 [GB] United Kingdom ............... 9418780

[51] Int. Cl.[7] .............. H04B 7/212; H04J 3/16; H04L 12/43
[52] U.S. Cl. ................. 370/337; 370/458; 370/468
[58] Field of Search .................... 370/321, 322, 370/326, 337, 347, 348, 448, 458, 465, 498, 499, 468

[56] References Cited

U.S. PATENT DOCUMENTS

| 4,736,371 | 4/1988 | Tejima et al. ............... 370/337 |
| 5,058,133 | 10/1991 | Duncanson et al. .......... 375/38 |
| 5,214,638 | 5/1993 | Norz et al. ............... 370/58.1 |
| 5,446,739 | 8/1995 | Nakano et al. ............ 340/95.3 |

FOREIGN PATENT DOCUMENTS

0 399 611  11/1990  European Pat. Off. ......... H04M 1/72

OTHER PUBLICATIONS

Wai–Choong Wong et al, "Integrated data and speech transmission using packet reservation multiple access", IEEE International Conference on Communications '93, vol., 1, pp. 172–176.

Copy of the International Search Report.

*Primary Examiner*—Alpus H. Hsu
*Assistant Examiner*—Afsar M. Qureshi
*Attorney, Agent, or Firm*—Fish & Richardson P.C.

[57] ABSTRACT

In a communications between a base station and subscriber unit in time slots within fixed length time frames, different types of messages require different numbers of timeslots per frame to maintain transmission rate. At least a portion of the message is detected to determine the type of message, and if appropriate, additional time slot(s) are assigned.

19 Claims, 4 Drawing Sheets

REDUCING A MULTI-BEARER

TRANSMISSION OF DIGITAL DATA MESSAGES IN DIGITAL TELEPHONY

The invention relates to digital data transmission in time slots within fixed length time frames, in particular, time division multiplexing/time division multiple access (TDM/TDMA) digital telephony.

Conventional TDM/TDMA systems, such as GSM ("Global System for Mobile communications") systems are not suited to the transmission of non-speech data and facsimile. As discussed in Cellular Radio Systems, D M Balston & R C V Macario (Editors), Artech House Inc. 1993, Chapter 14, Pages 315 to 323, GSM equipment performs erratically in transmitting Group 3 facsimile signals, and cannot handle Group 4 facsimile. A key problem is the limited bandwidth which is available. Each data or telefax transmission is sent at a conventional rate in a designated slot in successive TDMA frames. Also, ISDN (Integrated Services Digital Network) transmissions require increased bandwidth.

The present invention is defined in the claims, to which reference should now be made.

The present invention preferably provides a method of transmitting a digital data message between a sending unit and a receiving unit using a TDMA data transmission scheme, a slot or slots in successive TDMA frames being assigned for transmission of the message, in which at least a portion of the message is detected to determine a parameter of the message, at least one further slot is selectively assigned for transmission of the message dependent on said parameter. The message is allocated to the assigned slots for transmission then reconstituted at the receiving unit. The first slot or slots and the further slot or slots are preferably included in each frame.

The number of slots which are used to carry a message can be increased, or decreased, without terminating the call connection between the sending unit and the receiving unit. The effect of adding an additional slot or slots is to provide more bandwidth within which to transmit the message. As the assignment of slots is varied depending on need, it is not necessary to have full knowledge, when a call is first established, of what bandwidth might be required.

Preferably, the sending unit and receiving unit are a base station and subscriber unit. The assignment of slots is preferably undertaken by the base station. When a call is first established, the system does not know whether the message is speech on the one hand, or non-speech voice-band data on the other hand, such as from a modem or facsimile machine, or an ISDN message. Facsimile messages are preferably carried in two slots per frame unless a second slot is unavailable due to the large amount of communication traffic on the system at that time. Using two slots per frame effectively doubles the data transmission rate. ISDN messages are preferably carried on two to five slots per frame, with the corresponding multiplication of transmission rate.

The detection process preferably occurs at the base station to determine the parameter which indicates whether a faster transmission rate is desirable. If so, a decision is made to assign a further slot or slots.

A detection process occurs at the base station to determine whether the message being transmitted in a first slot is speech or voice-band data. A detector at the base station can perform this function, in particular, by detecting whether the message includes standard modem answertone or facsimile handshake or ISDN call set-up signalling or any other characteristic expected if the call includes voice-band data. If this characteristic is detected, a decision to assign an additional slot or slots is made.

The present invention also preferably provides communication means for communicating a digital message using a TDMA data transmission scheme, the communication means including a sending unit and a receiving unit, at least one of said units including first slot assignment means operative to assign a slot in successive TDMA frames, and second slot assignment means operative to selectively assign a second or subsequent slot, the sending unit including means operative to divide the message between the assigned slots, and the receiving unit including means operative to reconstitute the message.

The present invention in another aspect preferably provides a base station comprising transmission means for transmission of TDMA digital data signals and reception means for receiving TDMA digital data signals, the base station including means to assign a first slot in a frame for communication with a subscriber unit, means to detect at least a portion of the transmitted signal to determine a parameter of the transmitted signal and means to selectively assign a second or subsequent slot for communication with the subscriber unit dependent on the sampled parameter.

A preferred embodiment of the invention will now be described, by way of example, with reference to the drawings in which.

The Basic System

Figure 1:
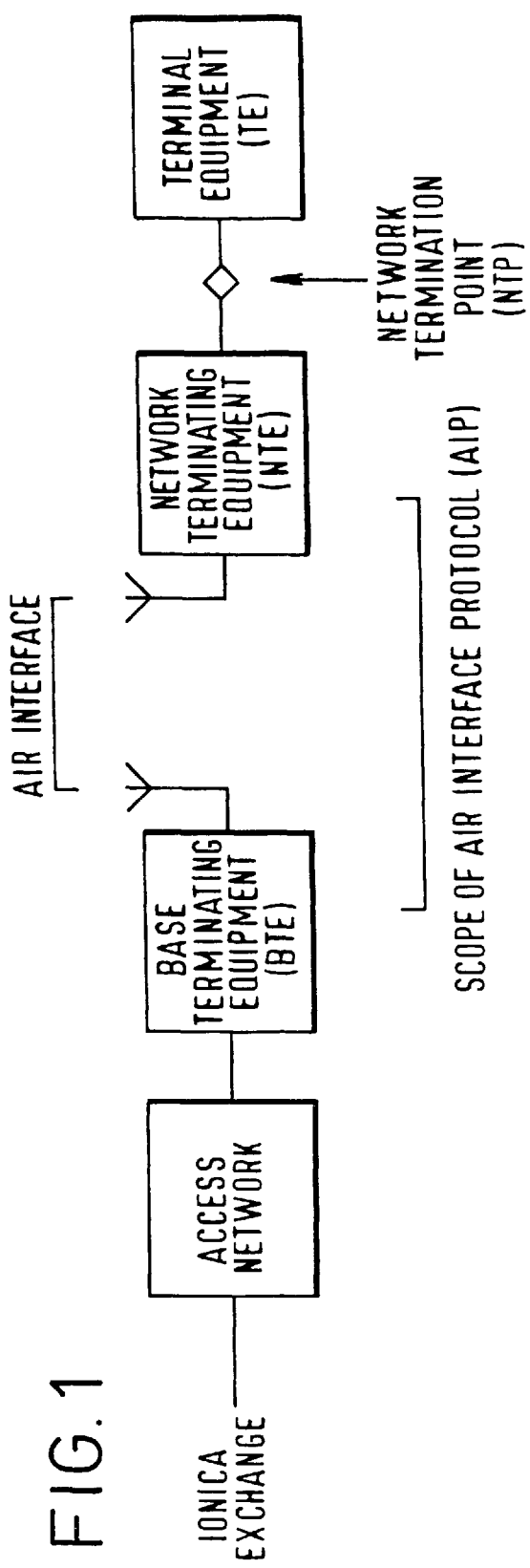
FIG. 1 is a schematic diagram illustrating the system including a base station (BTE—Base Terminating Equipment) and subscriber unit (NTE—Network Terminating Equipment)

As shown in FIG. 1, the preferred system is part of a telephone system in which the local wired loop from exchange to subscriber has been replaced by a full duplex radio link between a fixed base station (BTE) and fixed subscriber unit (NTE). The preferred system includes the duplex radio link (Air Interface), and transmitters and receivers for implementing the necessary protocol. There are similarities between the preferred system and digital cellular mobile telephone systems such as GSM which are known in the art. This system uses a protocol based on a layered model, in particular the following layers: PHY (Physical), MAC (Medium Access Control), DLC (DataLink Control), NWK (Network).

One difference compared with GSM is that, in the preferred system, subscriber units are at fixed locations and there is no need for hand-off arrangements or other features relating to mobility. This means, for example, in the preferred system directional antennae and mains electricity can be used.

Figure 2:
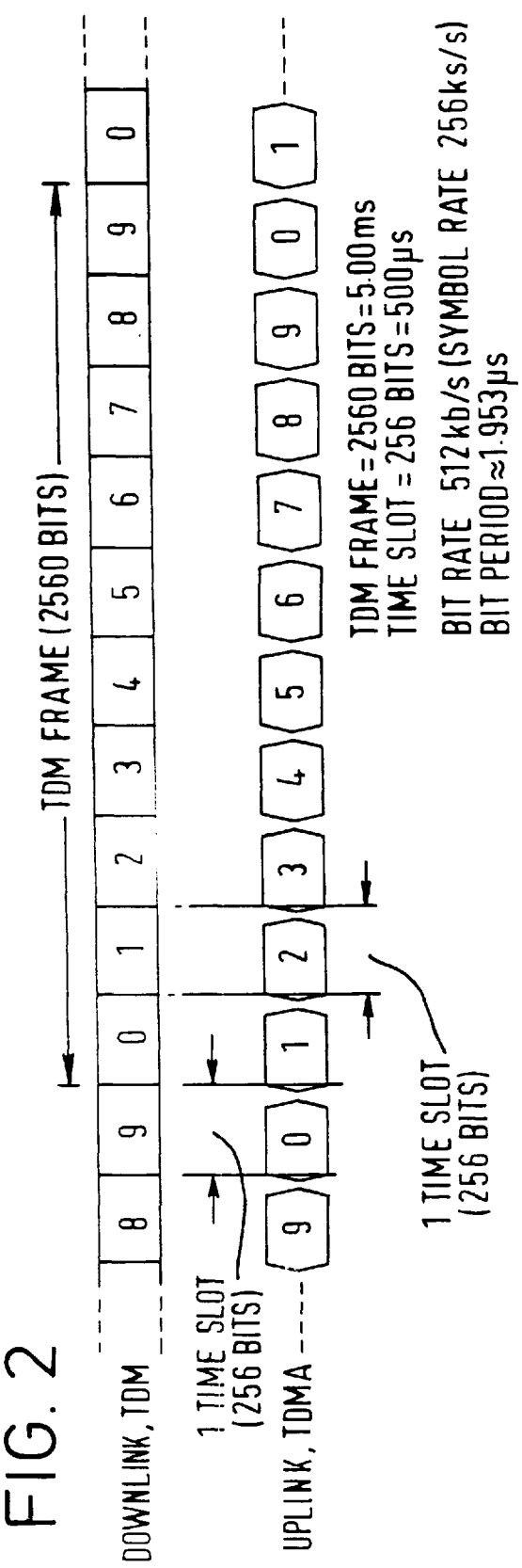
FIG. 2 is a diagram illustrating frame structure and timing for a duplex link.

Each base station in the preferred system provides six duplex radio links at twelve frequencies chosen from the overall frequency allocation, so as to minimize interference between base stations nearby. The frame structure and timing for a duplex link is illustrated in FIG. 2. Each duplex radio link comprises an up-link from a subscriber unit to a base station and, at a frequency offset, a down-link from the base station to the subscriber unit. The down-links are TDM, and the up-links are TDMA. Modulation for all links is π/4—DQPSK, and the basic frame structure for all links is ten slots per frame of 2560 bits, i.e. 256 bits per slot. The bit rate is 512 kbps. Down-links are continuously transmitted and incorporate a broadcast channel for essential system information. When there is no user information to be transmitted, the down-link transmissions continue to use the basic frame and slot structure and contain a suitable fill pattern.

For both up-link and down-link transmissions, there are two types of slot: normal slots which are used after call set-up, and pilot slots used during call set-up.

Each down-link normal slot comprises 24 bits of synchronisation information followed by 24 bits designated S-field which includes an 8 bit header followed by 160 bits designated D-field. This is followed by 24 bits of Forward Error Correction and an 8 bit tail, followed by 12 bits of the broadcast channel. The broadcast channel consists of segments in each of the slots of a frame which together form the down-link common signalling channel which is transmitted by the base station, and contains control messages containing link information such as slot lists, multi-frame and super-frame information, connectionless messages, and other information basic to the operation of the system.

During the call set-up, each down-link pilot slot contains frequency correction data and a training sequence for receiver initialisation, with only a short S-field and no D-field information.

Up-link slots basically contain two different types of data packet. The first type of packet, called a pilot packet, is used before a connection is set up, for example, for an ALOHA call request and to allow adaptive time alignment. The other type of data packet, called a normal packet, is used when a call has been established and is a larger data packet, due to the use of adaptive time alignment.

Each up-link normal packet contains a data packet of 244 bits which is preceded and followed by a ramp of 4 bits duration. The ramps and the remaining bits left of the 256 bit slot provide a guard gap against interference from neighbouring slots due to timing errors. Each subscriber unit adjusts the timing of its slot transmissions to compensate for the time it takes signals to reach the base station. Each up-link normal data packet comprises 24 bits of synchronisation data followed by an S-field and D-field of the same number of bits as in each down-link normal slot.

Each up-link pilot slot contains a pilot data packet which is 192 bits long preceded and followed by 4 bit ramps defining an extended guard gap of 60 bits. This larger guard gap is necessary because there is no timing information available and without it the propagation delays would cause neighbouring slots to interfere. The pilot packet comprises 64 bits of sync followed by 104 bits of S-field which starts with an 8 bit header and finishes with a 16 bit Cyclic Redundancy Check, 2 reserved bits, 14 FEC 9 bits, and 8 tail bits. There is no D-field.

The S-fields in the above mentioned data packets can be used for two types of signalling. The first type is MAC signalling (MS) and is used for signalling between the MAC layers of the base station and the MAC layer of a subscriber unit whereby timing is important. The second type is called associated signalling, which can be slow or fast and is used for signalling between the base station and subscriber units in the DLC or NWK layers.

The D-field is the largest data field, and in the case of normal telephony contains digitised speech samples, but can also contain non-speech data samples.

Provision is made in the preferred system for subscriber unit authentication using a challenge response protocol. General encryption is provided by combining the speech or data with a non-predicable sequence of cipher bits produced by a key stream generator which is synchronised to the transmitted super-frame number.

In addition, the transmitted signal is scrambled to remove dc components.

Multi-Bearer Operation

Data, such as digitised speech, is carried at a rate of 32 Kbps per slot of a TDMA frame. In cases where a faster rate is required, n-slots in each frame are used, giving a rate of n×32 Kbps. Each assigned slot can be considered to be a message bearer. Thus, when more than one slot per frame is assigned to a connection, the connection is designated a multi-bearer.

Multi-bearer operation is used to transmit voice-band non-speech data such as facsimile and modem data signals. These use 64 Kbps PCM coding. This data is sent via two slots per frame.

Figure 3:
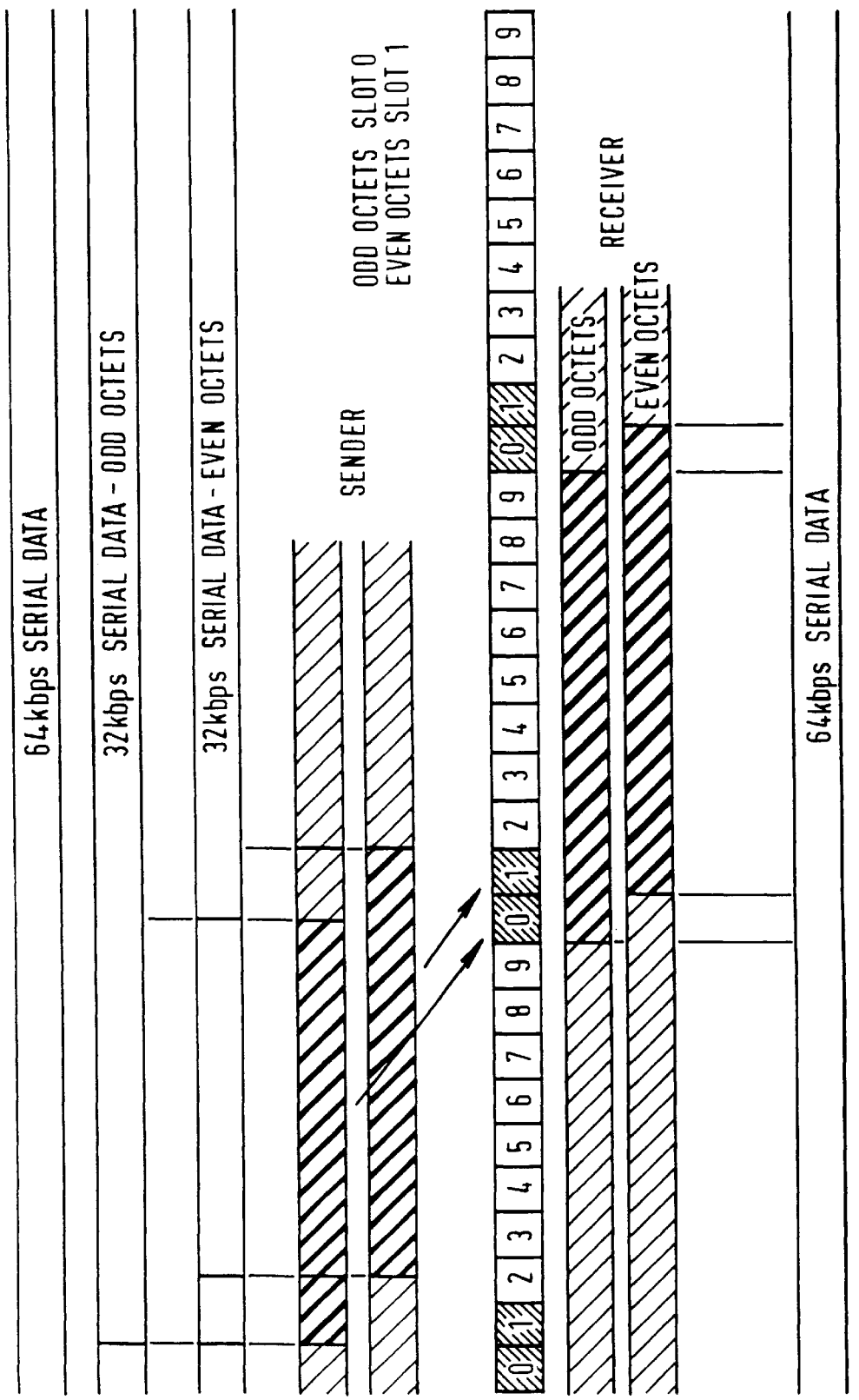
FIG. 3 is a diagram illustrating one example of how a digital message is assigned to multiple slots in a TDMA frame.

As shown in FIG. 3, a 64 Kbps data stream for transmission is divided into two 32 Kpbs data streams to be transmitted in different slots. Alternate octets (8 bits) are assigned to different slots, e.g. odd octets to slot 0 and even octets to slot 1. The octets within a n×160 bit sampling window are considered as successively numbered. Any pair of slots besides slots 0 and 1 can, of course, be chosen to carry the data, including slot 0 on two different RF carriers. At the receiver, the odd and even received octets are interleaved to reconstitute the original 64 Kbps message.

A multi-bearer connection is established, either by first establishing a single bearer connection, and then increasing the number of bearers, or paging the subscriber unit with a multi-bearer page request message. The paging procedure is similar to that for establishing a single bearer connection; however, the paging message contains the bearer requirements for the entire connection and can assign up to six slots as bearers.

Creation of a Multi-Bearer Connection

During a connection it may be necessary to increase or decrease the number of bearers used. An example is where following the detection of a voice-band data modem call, a second bearer needs to be allocated. This is done by the base station, which adds the new bearers.

Figure 4:
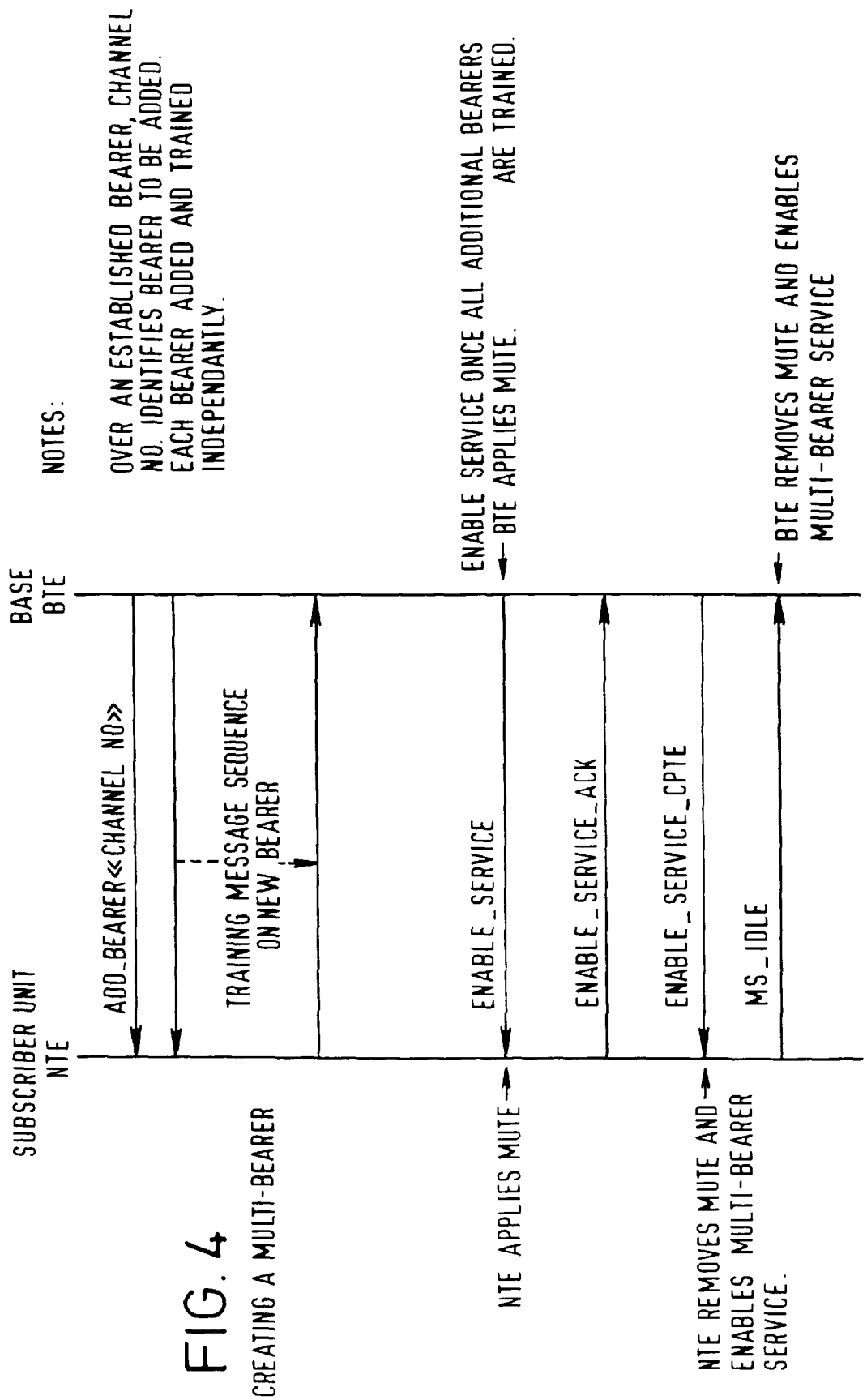
FIG. 4 is a diagram illustrating communications between a base station (BTE—Base Terminating Equipment) and subscriber unit (NTE—Network Terminating Equipment) in assigning a second slot.

FIG. 4 illustrates the protocol for adding bearers to a connection. In that figure, and in FIG. 5, the following abbreviations are used: Cpte—complete; Ack—acknowledge; no—number; MS—MAC Signalling.

Data is transmitted over the preferred system in a layered protocol similar to that used in GSM. When required, a decision is made in the upper NETWORK layer to provide a 64 Kbps PCM service. An Add-Bearer message is then sent via any established bearer indicating the bearer to be added. There is then a training sequence on each new bearer, and once completed, an Enable-Service message is sent by the base station to the subscriber unit and this is acknowledged by the subscriber unit. Receiver muting is applied whilst the new bearers are being added. The base station then sends an Enable-Service-Cpte message to the subscriber, which removes the muting. Once the subscriber ceases sending the acknowledgement signal to send another MS-Idle to the base station, the base station responds by removing the mute and the new multi-bearer service is then fully enabled.

Reducing the Number of Bearers in a Multi-Bearer

Figure 5:
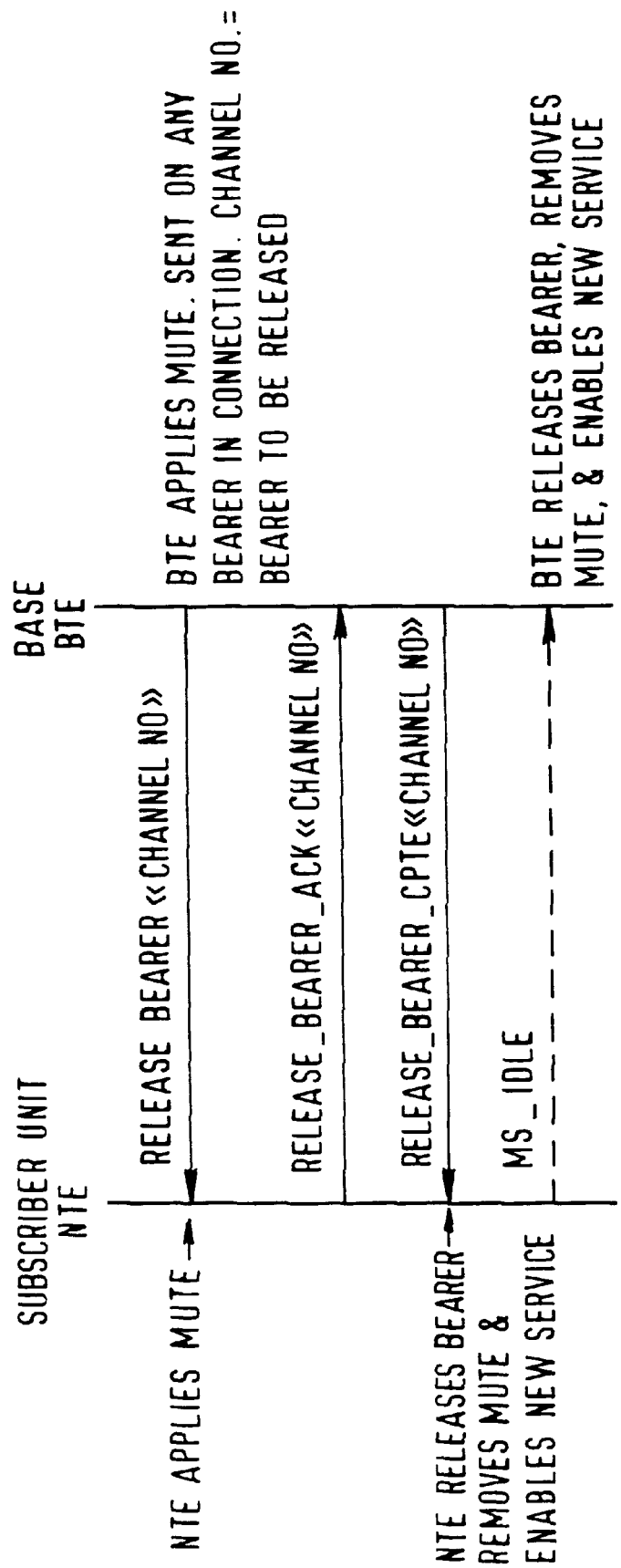
FIG. 5 is a diagram illustrating communications between a base station (BTE) and subscriber unit (NTE) in re-assigning a second slot which is no longer required.

To release a bearer which is no longer required, a decision is made in the NETWORK layer of the layered protocol. The new bearers to be used are identified, and bearers which have become redundant are released. FIG. 5 shows example control messages which are sent between the subscriber unit and base station.

We claim:

1. A method of transmitting a digital data message in time slots within fixed length time frames between a sending unit and a receiving unit, a time slot or slots in successive frames being assigned for transmission of the message, in which at least a portion of the message is detected to determine a parameter of the messages, and said parameter is used to deduce which, if any, of an assignment of at least one further slot and a deassignment of at least one slot is appropriate for transmission of the message, and in which the number of slots which are used to carry the message is increased or decreased in accordance with said deduction without terminating the message transmission between the sending unit and the receiving unit, in which method selectable at least one further slot is assigned dependent upon whether the message comprises speech, or non-speech voice-band data.

2. A method of transmitting a digital data message according to claim 1, by radio.

3. A method of transmitting a digital data message according to claim 1, in which the message is allocated to the assigned slots for transmission and reconstituted after reception at the receiving unit.

4. A method of transmitting a digital data message according to claim 1, in which the first slot or slots and the further slot or slots are included in each frame.

5. A method of transmitting a digital data message according to claim 1, in which the sending unit is a base station and the receiving unit is a subscriber unit.

6. A method of transmitting a digital data message according to claim 5, in which assignment of slots is undertaken by the base station.

7. A method of transmitting a digital data message according to claim 1, in which non-speech voice-band data is modem data, facsimile data or an ISDN message.

8. A method of transmitting a digital data message according to claim 1, in which a second slot is assigned for carrying a facsimile message such that two slots per frame are used for carrying the facsimile message unless a second slot is unavailable due to the large amount of communication traffic at that time.

9. A method of transmitting a digital data message according to claim 1, in which at least one further slot is assigned such that ISDN message are carried on between two and five slots per frame.

10. A method of transmitting a digital data message according to claim 1, in which the steps of detection to determine the parameter and further slot assignment are undertaken at the sending unit.

11. A method of transmitting a digital data message according to claim 1, in which the detection step includes determining whether the message includes a characteristic expected if the call includes voice-band data.

12. A method of transmitting a digital data message according to claim 1, in which the characteristic is standard modem answertone or facsimile handshake signalling or ISDN call set-up signalling.

13. Communication means for communicating a digital data message in time slots within fixed length time frames, the communication means including a sending unit and a receiving unit, at least one of said units including first slot assignment means operative to assign a time slot or slots in successive frames, and at least one of said units including second slot assignment means operative to selectively assign at least one further slot or deassign at least one slot, the second slot assignment means including detection means to detect at least a portion of the message to determine a parameter of the message and including assignment means to selectively assign said at least one further slot or deassign at least one slot dependent on the parameter without terminating the message transmission between the sending unit and the receiving unit, the sending unit including means operative to divide the message between the assigned slots, and the receiving unit including means operative to reconstitute the message, in which the assignment means selectable assigns at least one further slot dependent upon whether the message comprises speech, or non-speech voice-band data.

14. Communication means according to claim 13, in which the sending unit sends by radio.

15. Communication means according to claim 13, in which the receiving unit is at a fixed location.

16. Communication means according to claim 13, in which the sending unit is a base station and the receiving unit is a subscriber unit.

17. Communication means according to claim 16, in which the base station comprises the second slot assignment means.

18. A base station comprising transmission means for transmission of digital data signals in time slots of fixed length time frames and reception means for receiving digital data signals in corresponding time slots of fixed length time frames, the base station including means to assign a slot or slots in a frame for communication with a subscriber unit, means to detect at least a portion of the transmitted signal to determine a parameter of the transmitted signal, means to deduce from said parameter which, if any, of an assignment of at least one further slot and a deassignment of at least one slot is appropriate for communication with the subscriber unit and means to increase or decrease the number of slots used for communication with the subscriber unit in accordance with said deduction without terminating communication with the subscriber unit, in which the means to increase or decrease the number of slots selectable assigns at least one further slot dependent upon whether the message comprises speech, or non-speech voice-band data.

19. A base station according to claim 18, operative to transmit TDM digital data signals and receive TDMA digital data signals.

* * * * *